J. COLWELL.
Vacuum-Pans.

No. 157,987. Patented Dec. 22, 1874.

Witnesses.  
Wendell R. Curtis  
Ch. L. Burdett.

Inventor.  
Joseph Colwell  
by Theo. G. Ellis Atty

UNITED STATES PATENT OFFICE.

JOSEPH COLWELL, OF NEW YORK, N. Y.

IMPROVEMENT IN VACUUM-PANS.

Specification forming part of Letters Patent No. 157,987, dated December 22, 1874; application filed October 26, 1874.

*To all whom it may concern:*

Be it known that I, JOSEPH COLWELL, of the city and county of New York, in the State of New York, have invented certain new and useful Improvements in Vacuum - Pans; and I do hereby declare that the following is a full, clear, and exact description of the same, reference being had to the accompanying drawing, and to the letters of reference marked thereon.

Like letters in the figures indicate the same parts.

Vacuum-pans for boiling sugar are usually constructed with a concave bottom, somewhat resembling a funnel in form, in order to discharge the contents at the center when sufficiently boiled.

The heating is commonly done by steam-pipes of ordinary form, entering upon the side of the vacuum-pan, and passing around the bottom of the pan in a helical or spiral form, and having the exit or discharge near the center. These pipes follow the shape of the bottom, and are slightly raised above it. In this arrangement the central portion of the contained fluid (where the depth is the greatest) has a less proportional amount of heating-surface than the outer part, where the depth is less.

The object of my invention is to equalize the amount of heating-surface, so as to heat all parts of the fluid uniformly, and at the same time more rapidly, by increasing the size of the pipes near the center of the pan without interfering with its proper working.

My invention consists in arranging within the bottom of a vacuum-pan a hollow spiral band or volute, whose vertical depth increases toward the center in such a manner that the top is nearly or quite level, and the bottom of the convolutions is nearly or quite parallel to the bottom of the pan.

Figure 1:
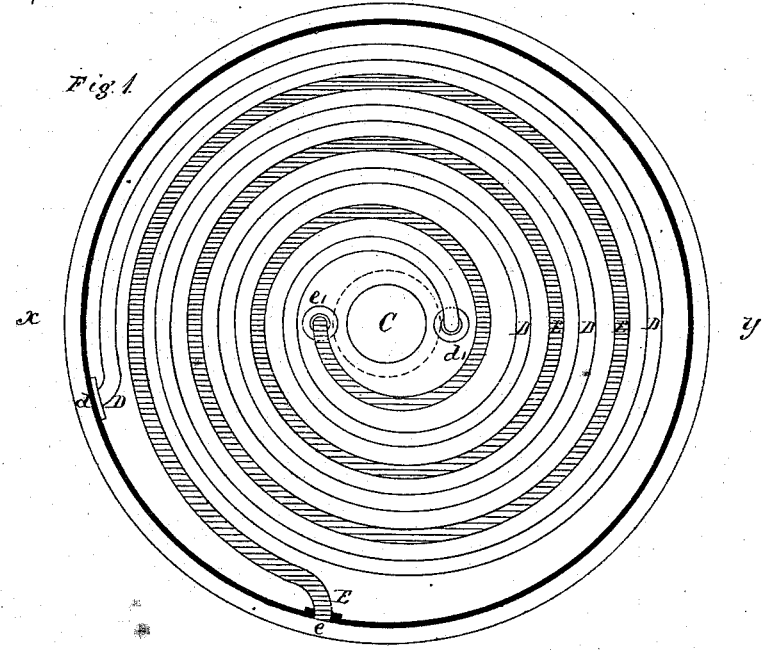
Figure 2:
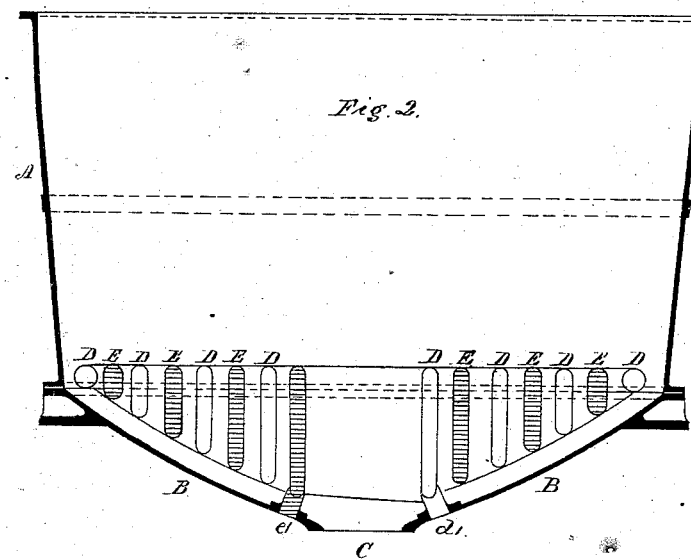

In the accompanying drawing, Figure 1 is a top view of the bottom part of a vacuum-pan, showing the helical steam-bands and the manner of connecting them with the pan. Fig. 2 is a vertical section of the same on the line *x y* of Fig. 1.

A A are the sides of the vacuum - pan. B is the bottom, in which is the central aperture C for discharging the contents. D and E are the helical bands or radiators, into which the steam enters to heat the contents of the vacuum - pan. There are two of these coils shown in the drawing, but there may be one or more, as desired. The two shown in the drawing are arranged concentrically, and one is shaded in order to distinguish it from the other. The radiator D is connected to the pan at *d*, where the steam enters it from a pipe outside, in the usual manner. It is also attached to the bottom of the pan at *d*, where the uncondensed steam and water of condensation escape. The radiator E is likewise connected to the vacuum-pan at its inlet and outlet *e* and *e'*. These bands or radiators are made of a uniform thickness, but of an increasing height as they approach the center of the pan, as shown more particularly in Fig. 2. They are furnished with the usual valves or cocks at the inlets and outlets, and may have the same arrangements and connections outside the pan as the coil-heaters in common use.

Inside of the vacuum-pan these radiators increase in vertical depth as they approach the center, in such a manner that the top of each turn or coil shall be at nearly the same level, or parallel with the surface of the fluid in the pan, while the bottom of each coil reaches deeper and deeper as they pass toward the center, following the line of the bottom of the pan, and only leaving the small space required for the proper flowing out of the boiled sirup.

It will be observed that, by means of my improvement, a much larger heating-surface is provided in the coils than by the ones in common use and also, that the heating-surface is more uniformly distributed through the mass of the fluid operated upon; and that this equal distribution of heat necessarily boils the contents of the pan to better advantage than is possible with the means heretofore used.

What I claim as my invention is—

The hollow helical steam-band D, having a gradually-increasing vertical depth from the circumference to the center, substantially as herein described.

JOSEPH COLWELL.

Witnesses:
 HOLBROOK CUSHMAN,
 A. F. CUSHMAN.